United States Patent
Dyer et al.

(10) Patent No.: US 10,029,316 B2
(45) Date of Patent: Jul. 24, 2018

(54) POLYCRYSTALLINE DIAMOND DRILL BIT HAVING A LASER CUT CHIP BREAKER

(71) Applicant: DIAMOND INNOVATIONS, INC., Worthington, OH (US)

(72) Inventors: Dwight Dyer, Kingston, OH (US); Cory Carpenter, Columbus, OH (US); David Miller, Galloway, OH (US)

(73) Assignee: DIAMOND INNOVATIONS, INC., Worthington, OH (US)

( * ) Notice: Subject to any disclaimer, the term of this patent is extended or adjusted under 35 U.S.C. 154(b) by 0 days.

(21) Appl. No.: 15/385,007

(22) Filed: Dec. 20, 2016

(65) Prior Publication Data
US 2017/0182566 A1    Jun. 29, 2017

Related U.S. Application Data

(60) Provisional application No. 62/271,435, filed on Dec. 28, 2015.

(51) Int. Cl.
*B23B 51/02* (2006.01)
*B23K 26/362* (2014.01)
(Continued)

(52) U.S. Cl.
CPC ............ *B23B 51/02* (2013.01); *B23K 26/362* (2013.01); *B23K 26/402* (2013.01);
(Continued)

(58) Field of Classification Search
CPC .......................... B23B 51/02; B23B 2251/48
(Continued)

(56) References Cited

U.S. PATENT DOCUMENTS

| | | | | |
|---|---|---|---|---|
| 1,069,930 A | * | 8/1913 | Down | E21B 10/44 408/223 |
| 1,467,491 A | * | 9/1923 | Oliver | B23B 51/02 408/230 |

(Continued)

FOREIGN PATENT DOCUMENTS

| | | |
|---|---|---|
| JP | 2004223648 | 8/2004 |
| JP | 2007216327 | 8/2007 |

(Continued)

OTHER PUBLICATIONS

Tool-Flo's Laser Technology, http://www.toolflo.com/catalogs/FL12014PCD.pdf.

(Continued)

*Primary Examiner* — Daniel Howell
*Assistant Examiner* — Yasir Diab
(74) *Attorney, Agent, or Firm* — Eric Shaffer

(57) ABSTRACT

A drill bit for a drill includes at least one flute having a rake face including a flute edge and at least one cutting edge having a profile that extends along at least a portion of a length of the cutting edge, the rake face extending from the cutting edge. A chip breaker formed in the rake face, the chip breaker being a continuous groove located adjacent the cutting edge, the groove having a starting end and an exit end opening into the flute edge, the starting end having a depth that is less than a depth of the exit end of the groove, wherein a shape of the groove at the starting end is different from a shape of the groove at the exit end.

18 Claims, 2 Drawing Sheets

(51) Int. Cl.
    *B23K 26/402*    (2014.01)
    *B23K 101/00*    (2006.01)
    *B23K 103/00*    (2006.01)
(52) U.S. Cl.
    CPC ..... *B23B 2226/315* (2013.01); *B23B 2251/18* (2013.01); *B23B 2251/48* (2013.01); *B23K 2201/002* (2013.01); *B23K 2203/50* (2015.10)
(58) Field of Classification Search
    USPC ........................................................ 76/108.6
    See application file for complete search history.

(56)         References Cited

U.S. PATENT DOCUMENTS

| 2,322,894 | A | * | 6/1943 | Stevens | B23B 51/02 |
|---|---|---|---|---|---|
| | | | | | 408/230 |
| 3,199,381 | A | * | 8/1965 | MacKey | B23B 51/02 |
| | | | | | 408/144 |
| 3,387,511 | A | * | 6/1968 | Ackart, Sr. | B23B 51/02 |
| | | | | | 408/230 |
| 3,564,947 | A | * | 2/1971 | Maier | B23B 51/02 |
| | | | | | 408/211 |
| 3,667,857 | A | * | 6/1972 | Shaner et al. | B23B 51/08 |
| | | | | | 408/230 |
| 5,011,342 | A | * | 4/1991 | Hsu | B23B 51/02 |
| | | | | | 408/224 |
| 5,160,232 | A | * | 11/1992 | Maier | B23B 51/02 |
| | | | | | 407/54 |
| 5,273,380 | A | * | 12/1993 | Musacchia | B23B 51/02 |
| | | | | | 408/227 |
| 5,299,471 | A | | 4/1994 | Tank et al. | |
| 5,355,750 | A | | 10/1994 | Scott et al. | |
| 5,388,484 | A | | 2/1995 | Bogner | |
| 5,873,683 | A | * | 2/1999 | Krenzer | B23B 27/22 |
| | | | | | 408/227 |
| 6,258,237 | B1 | | 7/2001 | Gal-Or et al. | |
| 6,447,560 | B2 | | 9/2002 | Jensen et al. | |
| 6,712,564 | B1 | | 3/2004 | Hughes et al. | |
| 7,824,134 | B2 | | 11/2010 | Webb et al. | |
| 8,137,035 | B2 | | 3/2012 | Uchijo et al. | |
| 8,672,590 | B2 | | 3/2014 | Tanaka et al. | |
| 2012/0213601 | A1 | | 8/2012 | Setoyama et al. | |
| 2012/0230785 | A1 | | 9/2012 | Chen et al. | |

FOREIGN PATENT DOCUMENTS

| KR | 100285402 | 1/2001 |
|---|---|---|
| KR | 20110005006 | 1/2001 |

OTHER PUBLICATIONS

The Laser Revolution in Tooling Industry, http://www.mapyourshow.com/MYS_Shared/imts14/handouts/IMTO52%20-%20The%20Laser%20Revolution%20in%20the%20Toolign%20Industry%20-%20Christoph%20Pluess.pdf.
Secomax (TM) CBN400C Chipbreaker Inserts, http://www.secotools.co/en-US/Global/Products/Advanced-cutting-materials/PCBN/Secomax-Chipbreaker/.

* cited by examiner

POLYCRYSTALLINE DIAMOND DRILL BIT HAVING A LASER CUT CHIP BREAKER

RELATED APPLICATION DATA

The instant application claims priority to U.S. Provisional Patent Application No. 62/271,435 filed Dec. 28, 2015, the entire disclosure of which is hereby incorporated by reference.

TECHNICAL FIELD

The present disclosure relates to a polycrystalline diamond (PCD) drill bit having a laser cut chip breaker and a method of forming the same.

SUMMARY

In one embodiment, a drill bit for a drill includes at least one flute having a rake face including a flute edge and at least one cutting edge having a profile that extends along at least a portion of a length of the cutting edge, the rake face extending from the cutting edge. A chip breaker formed in the rake face, the chip breaker being a groove located adjacent the cutting edge, the groove having a starting end and an exit end, the starting end having a depth that is less than a depth of the exit end of the groove, wherein a shape of the groove at the starting end is different from a shape of the groove at the exit end.

In another embodiment, a method of laser cutting a chip breaker in a drill bit includes the steps of providing a drill bit, the drill bit having at least one flute having a rake face including a flute edge and at least one cutting edge having a profile that extends along at least a portion of a length of the cutting edge, the rake face extending from the cutting edge; positioning a laser at a first position that corresponds to a starting end of a groove, the starting end of the groove having a shallow depth; moving the laser along the cutting edge from the starting end to an exit end opening into the flute edge; increasing the depth of the groove from the starting end to the exit end; and forming a shape at the exit end of the groove that is different from a shape of the groove at the starting end.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

In machining applications of nonferrous materials, drills typically have a positive rake clearance along with axial cutting force to shear nonferrous materials as they are being machined. The material is removed in the form of chips of various shapes and sizes depending on the cutting conditions, workpiece, tool materials, geometry of the cutting tool, etc. The chips typically flow out of the drill hole through the helical flutes on the drill. When a brittle material is machined, the chips produced are discontinuous, causing no difficulty in chip handling and disposal. When machining ductile, non-ferrous materials, continuous chips are formed that can cause some difficulties in the machining operation, which can affect productivity.

A chip breaker is used to break the continuous chip into small pieces to decrease cutting forces. The elimination of cutting forces increases tool life along machined part preventing the same from being damaged due to added tool pressure. Further, a chip breaker is sometimes required so that the continuous type chips cannot tangle around the bit.

The present disclosure is related to a drill having a chip breaker and a method of making the same, which enhances the removal of chips away from the cutting edge increasing the life of the drill point.

Figure 1:
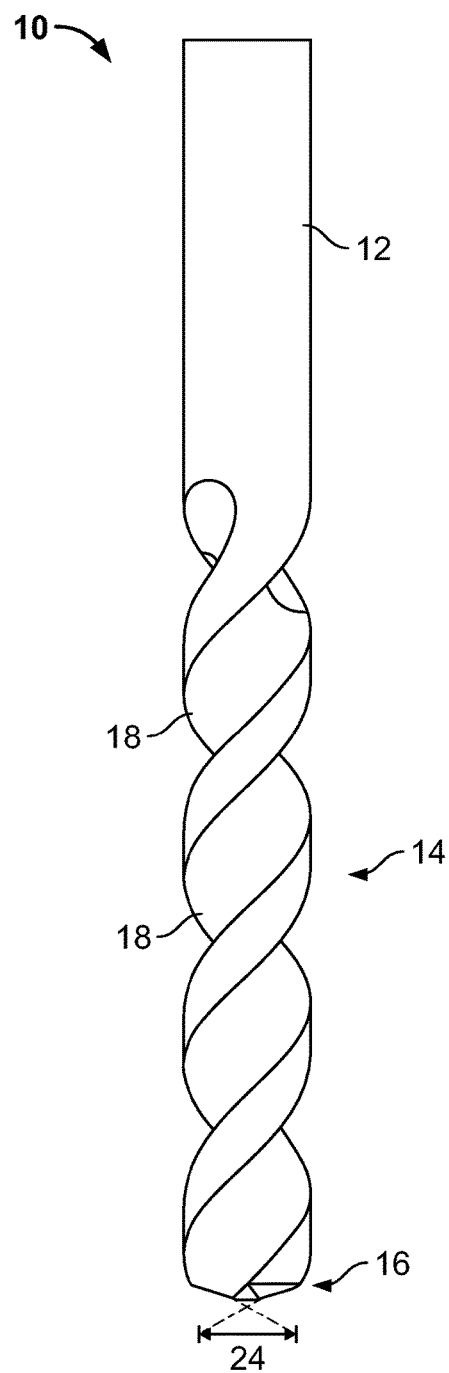
FIG. 1 is a perspective view of a drill bit according to the present disclosure.

Referring to FIG. 1, a polycrystalline diamond (PCD) twist drill 10 according to the present disclosure includes a shank 12, a drill body 14 and a drill tip 16. It should be appreciated that drill 10 can be made from a variety of different materials in addition to PCD, for example, polycrystalline cubic boron nitride (PCBN), cubic boron nitride (CBN), cemented carbide, ceramics and other metallic material. A plurality of helical flutes 18 extends from drill tip 16 to drill body 14. Each flute has a helix angle, for example, an angle of about 0 to about 48°, depending on the material being machined. In order to aid in chip removal, tip 16 can include a coolant channel or hole.

Tip 16 can be attached to body 14 or formed integrally therewith. Tip 16 can be non-ferrous and ferrous materials, for example, polycrystalline diamond (PCD) formed in a high temperature, high pressure (HPHT) press or selected from a variety of other materials, for example, cubic boron nitride (CBN), cemented carbide, ceramic or other metallic materials.

Figure 2:
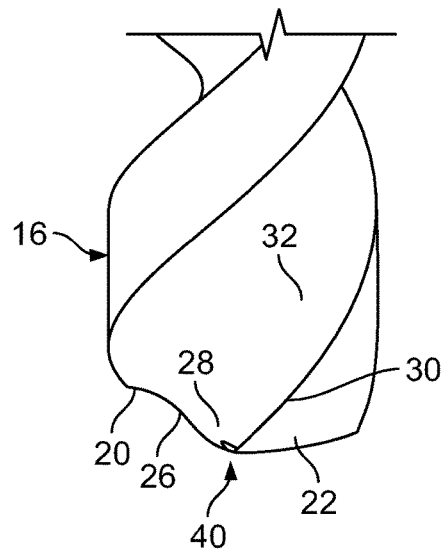
FIG. 2 is an enlarged view of the drill bit of FIG. 1

Referring to FIG. 2, tip 16 includes at least two opposed cutting edges 20 and 22. Cutting edges 20, 22 form a point having a predetermined point angle 24 (FIG. 1). It should be appreciated that the present disclosure is not limited to any particular point angle. The cutting edges can each have a concave profile 26 that extends along the entire length of the cutting edge or at least just a portion thereof.

Each flute includes a rake face 32 adjacent and extending from the respective cutting edge. Cutting edges 20 and 22 are further defined from respective lands 28 formed by the leading edge 30 of drill flutes 16.

The cutting edges 20, 22 include at least one chip breaker 40, which as the material is being cut it is lifted up and over the face of chip breaker to facilitate chip breaking and prevent clogging. The concave profile 26 of the cutting edges minimizes chip flow over chip breaker 40.

Figure 3:
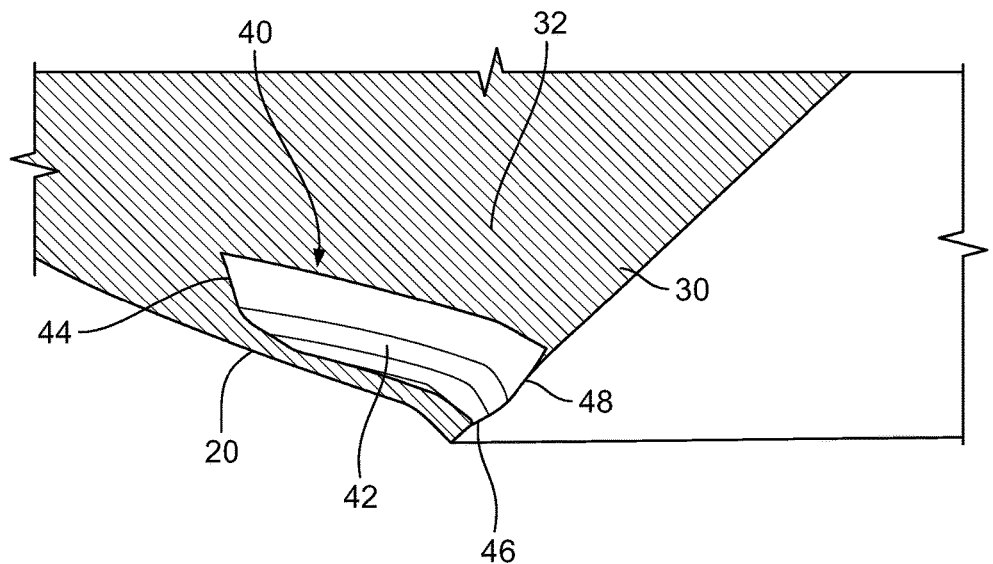
FIG. 3 is an enlarged view of the chip breaker of the present disclosure.

As shown in detail in FIG. 3, chip breaker 40 can be a groove formed in rake face 32 along the cutting edge 20. As will be described further herein, chip breaker 40 is a laser cut groove. It should be appreciated that multiple chip breakers can be provided in the tip, however, only a single chip breaker is illustrated for simplicity. Also, in addition to a groove other shapes/geometries/designs of the chip breaker are contemplated. For example, groove 42 could include one or more protrusions therein to aid in faster breaking of the elongated chips.

Chip breaker 40 can be a continuous groove 42 spaced adjacent the cutting edge, for example, spaced of about 0.1 mm to about 2.0 mm behind the cutting edge, and opening into flute edge 30. This position aids in both the movement and formation of a chip.

Groove 42 can be shape/curved to correspond to concave profile 26 of the cutting edge. The shape and proportions of the groove are such to improve chip breaking and decrease flow of the chips over the chip breaker to, in turn, decrease cutting forces due to chip breaking.

It should be appreciated that the dimensional values of the chip breaker groove will vary according to the drill size being used and the feed rate of the drill and thus the chip breaker dimensions are not limited to any particular dimension. For example, groove 42 can range from of about 0.01 mm to about 2.5 mm in depth and have a length that is dependent on the size of drill, e.g, of at least about 65% of the length of the cutting edge.

Continuous groove 42 is formed by a pair of sides 38 and has its shallowest depth at a starting end 44 and increasing in depth to an opposed exit end 46 that opens into edge 30. A radius or shoulder 48 is created at end 46 and causes the groove to have a different shape than the groove at starting end 44. Shoulder 48 enables a change in rake angle of drill depending on the application or use. It further minimizes the risk of the chip being removed without breaking and helps reinforce cutting edge strength.

Figure 4:
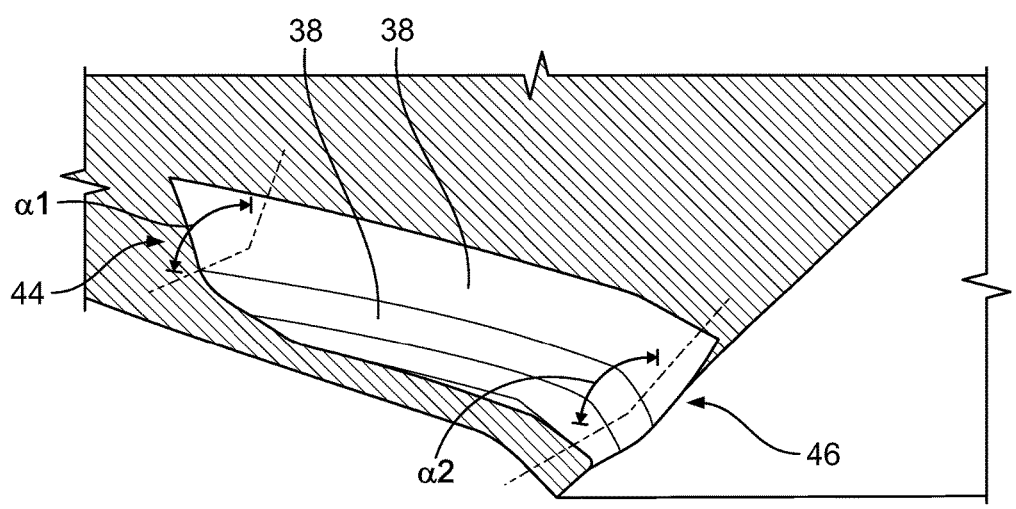
FIG. 4 is an enlarged view of the groove of the chip breaker.

As shown in FIG. 4, an angle $\alpha_2$ formed between sides 38 at exit end 46 of groove 40 is slightly increased from an angle $\alpha_1$ formed between sides 38 at starting end 44. This increase in angle and depth from end 44 to end 46 will aid the chip breaking capability of the groove.

Known chip breakers are pre-formed in conventional cutting tools. With PCD tools the chip breakers have to be produced/eroded therein using electro discharge machines (EDM). Accordingly, size and shape of the chip breakers are limited.

As set forth above, groove 42 of chip breaker 40 has multiple cutting angles and depths to help promote smoother cutting and eliminate possibilities of elongated chips. Thus, using electro discharge machining is not a viable option for the shape of groove 42 of the present disclosure.

Accordingly, the present disclosure further relates to a method of laser cutting a chip breaker in the drill point. To achieve the correct form of the chip breaker the laser will need to position the chip breaker starting at a shallow depth at starting end 44 and increasing the depth to create a radius or shoulder 48 at the bottom or exit end 46 of the groove. The exiting part of the cut will have a larger angle and somewhat of a different shape than the entrance part of the cut.

It should be appreciated that the laser will make numerous passes across groove 42 cutting until the desired shape/geometry of the groove is formed, however, a single pass can be made depending on the same. In order to form the desired groove, the laser is programmed and controlled in a known manner. Accordingly, smaller profiles, complex forms and designs of the chip breaker can be achieved. Also, by laser cutting the chip breaker in the PCD drill, the variety of drills/equipment typically required to create the geometry of a chip breaker are eliminated.

Further, it should be appreciated that the chip breaker of the present disclosure can be formed in a plurality of different cutting tools or any device utilizing a cutting edge and is not limited to a twist drill.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A drill bit for a drill comprising:
   at least one flute having a rake face including a flute edge;
   at least one cutting edge having a profile that extends along at least a portion of a length of the cutting edge, the rake face extending from the cutting edge; and
   a chip breaker formed in the rake face, the chip breaker being a groove located adjacent the cutting edge, the groove having a starting end and an exit end, the starting end having a depth that is less than a depth of the exit end of the groove, wherein a shape of the groove at the starting end is different from a shape of the groove at the exit end and wherein the groove has a pair of sides that form an angle therebetween, the angle increasing from the starting end to the exit end.

2. The drill bit of claim 1, wherein the drill bit is selected from the group of polycrystalline diamond, PCBN, CBN, cemented carbide, ceramic and other metallic materials.

3. The drill bit of claim 1, wherein the groove is a continuous groove.

4. The drill bit of claim 1, wherein the exit end of the groove opens into the flute edge.

5. The drill bit of claim 1, wherein the groove is a laser cut made in the rake face.

6. The drill bit of claim 1, wherein the profile of the cutting edge is concave.

7. The drill bit of claim 6, wherein the groove is shaped to correspond to the concave profile of the cutting edge.

8. The drill bit of claim 1, wherein the depths of the groove from the starting end to the exit end range from about 0.01 mm to about 2.5 mm.

9. The drill bit of claim 1, wherein the groove has a length that ranges at least about 65% of a length of the cutting edge.

10. The drill bit of claim 1, wherein the exit end contains a tip that includes a coolant channel.

11. The drill bit of claim 1, wherein the groove forms a shoulder at the exit end thereof.

12. A method of laser cutting a chip breaker in a drill bit comprising the steps of:
   providing a drill bit, the drill bit having at least one flute having a rake face including a flute edge and at least one cutting edge having a profile that extends along at least a portion of a length of the cutting edge, the rake face extending from the cutting edge;
   positioning a laser at a first position that corresponds to a starting end of a groove, the starting end of the groove having a shallow depth;
   moving the laser along the cutting edge from the starting end to an exit end opening into the flute edge;
   increasing the depth of the groove from the starting end to the exit end; and
   forming a shape at the exit end of the groove that is different from a shape of the groove at the starting end, wherein the groove is laser cut to have a pair of sides that form an angle therebetween, the angle increasing from the starting end to the exit end.

13. The method of claim 12, wherein the drill bit is selected from the group of polycrystalline diamond, PCBN, BZN, CBN, cemented carbide, ceramic and other metallic materials.

14. The method of claim 12, wherein the groove is a laser cut in the rake face.

15. The method of claim 12, wherein the profile of the cutting edge is concave and the groove is cut to correspond to the concave profile of the cutting edge.

16. The method of claim 12, wherein the depth of the groove from the starting end to the exit end ranges from about 0.01 mm to about 2.5 mm.

17. The method of claim 12, wherein the groove is laser cut to a length that is at least about 65% of a length of the cutting edge.

18. The method of claim 12, further comprising forming a shoulder at the exit end of the groove.

\* \* \* \* \*